(12) United States Patent
Qi et al.

(10) Patent No.: US 9,748,762 B2
(45) Date of Patent: Aug. 29, 2017

(54) METHOD AND APPARATUS FOR THE PROTECTION OF DC DISTRIBUTION SYSTEMS

(71) Applicant: ABB Technology AG, Zurich (CH)

(72) Inventors: Li Qi, Cary, NC (US); Jiuping Pan, Raleigh, NC (US)

(73) Assignee: ABB SCHWEIZ AG (CH)

( * ) Notice: Subject to any disclaimer, the term of this patent is extended or adjusted under 35 U.S.C. 154(b) by 60 days.

(21) Appl. No.: 14/255,674

(22) Filed: Apr. 17, 2014

(65) Prior Publication Data

US 2015/0270704 A1 Sep. 24, 2015

Related U.S. Application Data

(60) Provisional application No. 61/968,559, filed on Mar. 21, 2014.

(51) Int. Cl.
  *H02H 7/26* (2006.01)
  *H02H 3/087* (2006.01)
  *H02H 3/093* (2006.01)
  *H02H 7/28* (2006.01)

(52) U.S. Cl.
  CPC ............ *H02H 7/268* (2013.01); *H02H 3/087* (2013.01); *H02H 3/0935* (2013.01); *H02H 7/28* (2013.01)

(58) Field of Classification Search
  USPC .................................................. 361/63, 65
  See application file for complete search history.

(56) References Cited

U.S. PATENT DOCUMENTS 3,654,519 A * 4/1972 South ..................... H02H 3/093
  361/115
4,722,059 A  1/1988 Engel et al.
  (Continued)

FOREIGN PATENT DOCUMENTS

CN    102195275 A    9/2011
CN    103457246 A    12/2013
  (Continued)

OTHER PUBLICATIONS

Barker, Carl, "HVDC as bulk power transfer system", SUPERGEN Wind 5th Training Seminar, Mar. 2011, 1-47.
  (Continued)

*Primary Examiner* — Zeev V Kitov
(74) *Attorney, Agent, or Firm* — Taft Stettinius & Hollister LLP

(57) ABSTRACT

While transient current magnitudes at different locations within a DC distribution system themselves are not a reliable indicator of fault location, it is recognized herein that accumulating energy or pseudo energy values provides a reliable basis for tripping the protection element at a fault location. Thus, in one aspect of the teachings herein, pseudo energy values are accumulated independently during a fault condition, for each of one or more protected branch circuits and the protection element for each such branch circuit is tripped responsive to the accumulated pseudo energy values reaching a defined pseudo energy threshold. The pseudo energy thresholds are defined so that the protection element in the branch circuit where the fault is located will trip first.

20 Claims, 3 Drawing Sheets

(56) References Cited

U.S. PATENT DOCUMENTS

| | | | |
|---|---|---|---|
| 4,951,634 A * | 8/1990 | Nishizawa | F02D 41/10 123/492 |
| 6,330,141 B1 | 12/2001 | Elms et al. | |
| 8,067,942 B2 | 11/2011 | Pan et al. | |
| 2004/0027749 A1* | 2/2004 | Zuercher | H02H 1/0015 361/62 |
| 2004/0136124 A1* | 7/2004 | Engel | H02H 3/042 361/42 |
| 2007/0100504 A1* | 5/2007 | Moxley | H02H 3/46 700/286 |
| 2007/0103833 A1 | 5/2007 | Harris et al. | |
| 2008/0164766 A1 | 7/2008 | Adest et al. | |
| 2012/0281796 A1* | 11/2012 | Fitz | H04L 7/0278 375/359 |
| 2013/0027829 A1 | 1/2013 | Antoniazzi et al. | |
| 2013/0271888 A1 | 10/2013 | Falk et al. | |
| 2013/0286521 A1 | 10/2013 | Park | |

FOREIGN PATENT DOCUMENTS

| | | |
|---|---|---|
| DE | 69830268 T2 | 1/2006 |
| DE | 102009027387 A1 | 1/2011 |
| EP | 1843443 A2 | 10/2007 |
| EP | 1914162 B1 | 6/2010 |
| EP | 2249393 A1 | 11/2010 |
| GB | 2487918 A | 8/2012 |
| JP | 10285966 A | 10/1998 |
| WO | 2006089904 A1 | 8/2006 |
| WO | 2008055493 A1 | 5/2008 |
| WO | 2010003835 A2 | 1/2010 |
| WO | 2010015334 A1 | 2/2010 |
| WO | 2011012174 A1 | 2/2011 |
| WO | 2012119645 A1 | 9/2012 |
| WO | 2012123014 A2 | 9/2012 |
| WO | 2012143245 A1 | 10/2012 |
| WO | 2013174726 A1 | 11/2013 |

OTHER PUBLICATIONS

Tang, Lianxiang et al., "Locating and Isolating DC Faults in Multi-Terminal DC Systems", IEEE Transactions on Power Delivery, vol. 22, No. 3, Jul. 2007, 1877-1884.

Cuzner, R M., et al., "The Status of DC Micro-Grid Protection," IEEE Industry Applications Society Annual Meeting, 2008. IAS '08. Oct. 5-9, 2008. pp. 1-8. Edmonton, California, US.

Karlsson, P., et al., "Fault Detection and Clearance in DC Distributed Power Systems," Nordic Workshop on Power and Industrial Electronics. NORPIE/2002. Aug. 12-14, 2002. pp. 1-6.

Salonen, P., et al., "Protection Scheme for an LVDC Distribution System," 20th International Conference and Exhibition on Electricity Distribution—Part 1, 2009. CIRED 2009. Jun. 8-11, 2009. pp. 1-4. Prague, Czech Republic.

Mahajan, N. R., "System Protection for Power Electronic Building Block Based DC Distribution Systems," Ph.D. Dissertation. North Carolina State University, Dept of Electrical Computer Engineering. Dec. 7, 2004. pp. 1-135.

Haj-Maharsi, M. Y., "Novel DC Ring Topology and Protection System—a Comprehensive Solution for Mega City Power Grids," Ph.D. Dissertation. North Carolina State University. Department of Electrical Engineering. 2009. pp. 1-258.

PCT International Search Report cited in counterpart PCT/US2015/021565 dated Aug. 25, 2015, 6 pages.

PCT Written Opinion cited in counterpart PCT/US2015/021565 dated Aug. 25, 2015, 10 pages.

* cited by examiner

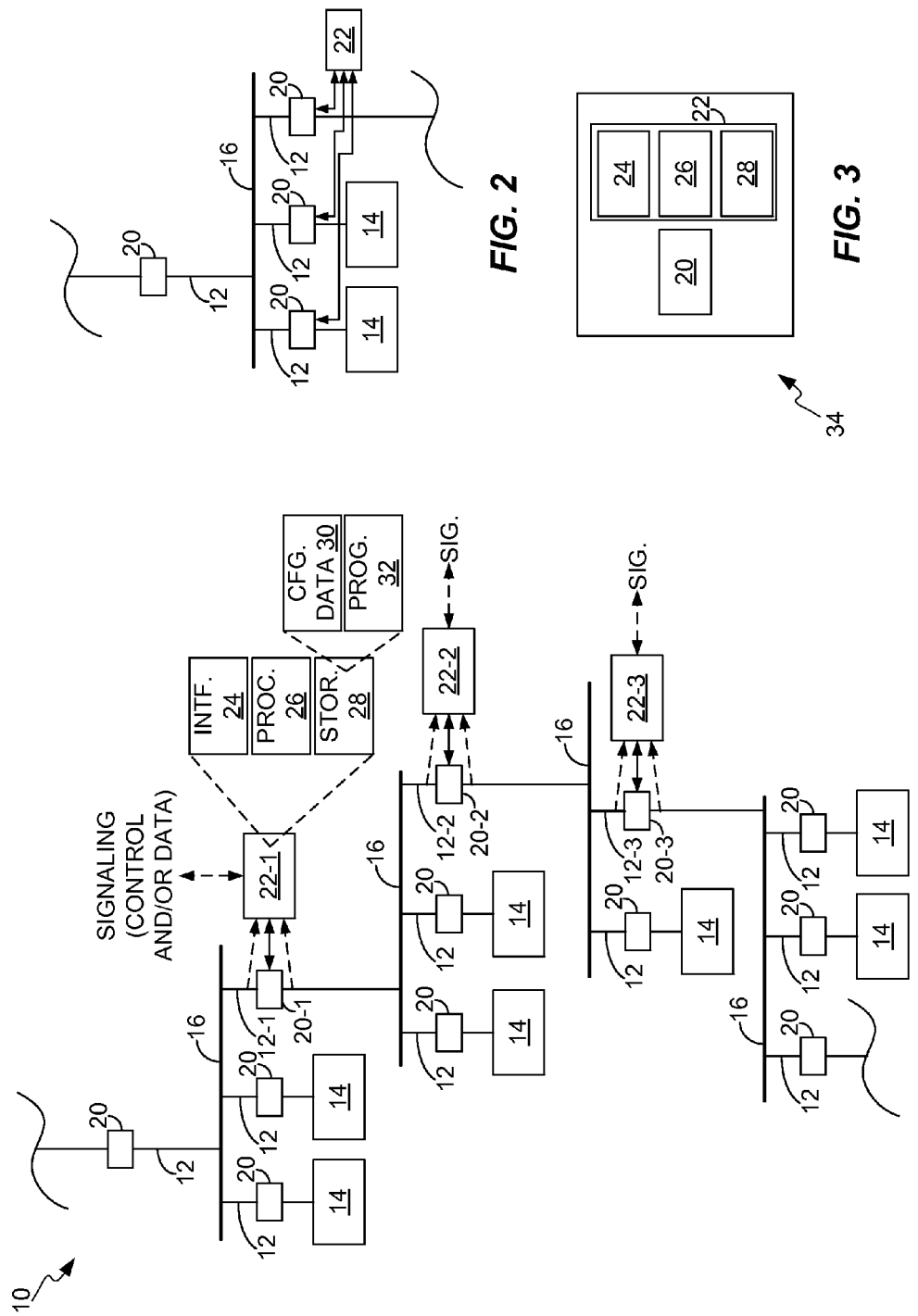

METHOD AND APPARATUS FOR THE PROTECTION OF DC DISTRIBUTION SYSTEMS

RELATED APPLICATIONS

This application claims priority under 35 U.S.C. §119 from U.S. Provisional Patent Application No. 61/968,559 filed on 21 Mar. 2014, the content of said application incorporated herein by reference in its entirety.

TECHNICAL FIELD

The present invention generally relates to Direct Current, DC, distribution systems and particularly relates to protecting branches within a DC distribution system.

BACKGROUND

Recent improvements in the energy and power densities of power electronic switches are among the developments facilitating the deployment and operation of DC power systems. DC distribution systems have long been used in certain applications—such as in certain types of industrial plants—but they are finding new and expanded usage in a variety of fields, including shipboard power systems, photovoltaic, and other types of renewable energy generation systems.

While DC distribution systems offer a number of advantages in such contexts, including reductions in the amount or types of equipment needed for power generation and/or conversion and increased efficiency, they also offer a number of challenges. For example, it is recognized herein that challenges arise with respect to determining the location of faults in a DC distribution system. In one aspect of these challenges, steady-state fault currents in different branches and on different buses within radial DC distribution systems may be quite similar, as a consequence of low circuit impedances. Further, fault location techniques that rely on current derivatives are unreliable in DC distribution systems, because different branches experience different transient current waveforms, e.g., as a consequence of energy storage devices or other energy resources being present at various locations in the system and RLC differences among the branches.

SUMMARY

While transient current magnitudes at different locations within a Direct Current, DC, distribution system themselves are not a reliable indicator of fault location, it is recognized herein that accumulating energy or pseudo energy values provides a reliable basis for tripping the protection element at a fault location. Thus, in one aspect of the teachings herein, pseudo energy values are accumulated independently during a fault condition, for each of one or more protected branch circuits and the protection element for each such branch circuit is tripped responsive to the accumulated pseudo energy values reaching a defined pseudo energy threshold. The pseudo energy thresholds are defined so that the protection element in the branch circuit where the fault is located will trip first.

In one example, a method of protecting a branch circuit in the DC distribution system is implemented in a control apparatus. The method includes determining that a fault condition exists in the DC distribution system and accumulating pseudo energy values while the fault condition persists, based on repeatedly sampling current for the branch circuit. The method further includes tripping a protection element for the branch circuit responsive to the accumulated pseudo energy values reaching a defined pseudo energy threshold. The same method can be applied to a plurality of branch circuits in the DC distribution system, with pseudo energy accumulated independently for each branch circuit location. In such arrangements, the protection element for the branch circuit directly involved in the fault generally will trip first because pseudo energy will accumulate faster at the point of the fault as sources contribute most transient currents into the fault location.

In another example, a control apparatus is configured to protect a branch circuit in a DC distribution system. The control apparatus includes an interface circuit that is configured to obtain local measurements for the branch circuit, and a processing circuit that is configured to determine that a fault condition exists in the DC distribution system. The processing circuit is further configured to accumulate pseudo energy values while the fault condition persists, based on repeatedly sampling current for the branch circuit, and to trip a protection element for the branch circuit responsive to the accumulated pseudo energy values reaching a defined pseudo energy Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a block diagram of one embodiment of a DC distribution system, including an example arrangement of control apparatuses as contemplated herein for protecting one or more branch circuits within the DC distribution system.

FIG. 2 is a block diagram of another embodiment of a DC distribution system, including another example control apparatus arrangement.

FIG. 3 is a block diagram of another embodiment of a control arrangement configured for the protection of a branch circuit in a DC distribution system.

DETAILED DESCRIPTION

Figure 4:
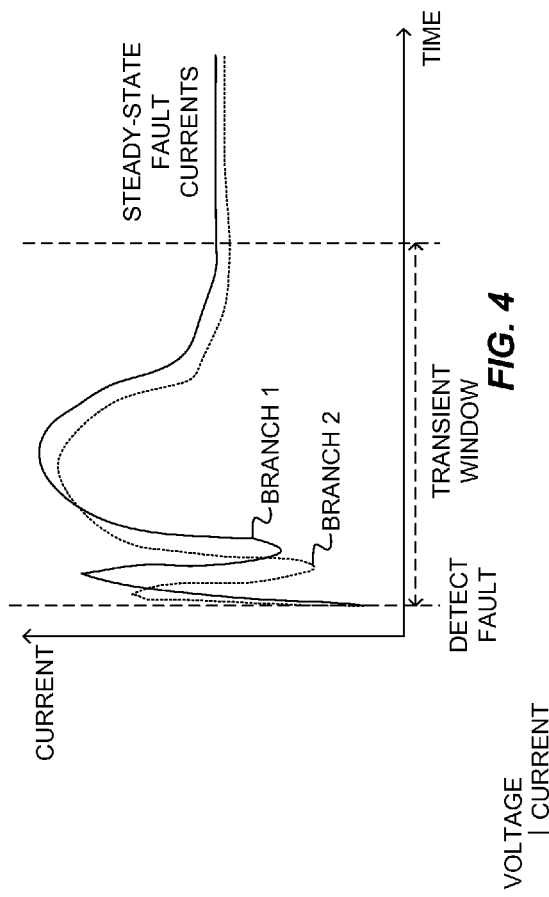
FIG. 4 is an example plot of currents for a first branch circuit directly involved in a fault within a DC distribution system, and a second branch circuit in the system that is remote from the fault.

FIG. 1 illustrates one embodiment of a Direct Current, DC, distribution system 10, referred to simply as the system or grid 10. The system 10 includes a number of branch circuits 12 and provides electric power to a number of loads 14. In the depicted example, the system 10 includes a number of buses 16, which may be understood as being hierarchical in that an upstream bus 16 powers a downstream bus 16 via a branch circuit 12. While not shown, the system 10 receives electric power from a supply system or network, such as via a substation coupled to a transmission system.

The various branch circuits 12 include protection elements 20, which in a non-limiting sense may be fuses, mechanical switches, or power-electronic devices operated as protective switches. At least some of these protection elements 20 are associated with and controlled by control apparatuses 22, which according to the teachings herein are configured to trip or otherwise actuate the protection elements 20 based on "pseudo energy" measurements as taught herein. The term "pseudo energy" highlights the fact that the control apparatuses 22 at least make energy-like measurements, but these measurements may be simplified such that they are not a strict energy calculation.

For example, pseudo energy is calculated from power calculations that are simplified by assuming a fault-current resistance value of unity, i.e., R=1. Additionally or alternatively, pseudo energy calculations use cubed or higher-power values of measured current, rather than the squared current value associated with the calculation of electric power. Importantly, the pseudo energy accumulations taught herein capture the discharging currents from downstream capacitors within the system 10, meaning that differences in fault current magnitudes at different locations in the system 10 are accentuated by the pseudo energy values accumulated with respect to those different locations, while differences in time constants at different locations are smoothed.

By way of example, a first branch circuit 12 is designated as branch circuit 12-1 and it includes a first protection element 20-1 that in turn is associated with a first control apparatus 22-1. A second branch circuit 12-2 is downstream from the first branch circuit 12-1 in terms of the electrical structure or topology of the system 10, and it includes a second protection element 20-2 that is associated with a second control apparatus 22-2. Similarly, a third branch circuit 12-3 is downstream from the second branch circuit 12-2, and it includes a third protection element 20-3 that is associated with a third control apparatus 22-3.

When suffixes are not needed for clarity, the reference numeral "22" is used to refer to any given control apparatus 22 in the singular or to multiple control apparatuses 22 in the plural sense. The same approach is used for branch circuits 12 and for protection elements 20.

Each control apparatus 22 in the example embodiment includes an interface circuit 24, a processing circuit 26, and a storage device or circuit 28. The storage device 28 comprises a computer-readable medium that, at least after setup for installation, stores configuration data 30. Example devices include but are not limited to FLASH and/or EEPROM. Further, in embodiments where processing circuit 26 comprises digital processing circuitry that is programmatically configured via the execution of computer program instructions, the storage device 28 stores a computer program 32, the execution of which specially adapts a microprocessor or other digital processor as the processing circuit 26 to carry out the processing algorithms taught herein. Broadly, however, the processing circuit 26 may comprise fixed circuitry, programmed circuitry, or a mix of both.

FIG. 2 illustrates another embodiment, where a given control apparatus 22 is coupled to more than one protection element 20 and is configured to perform monitoring and control with respect to the individual branch circuits 12 corresponding to the multiple protection elements 20. Thus, in some embodiments, at least one control apparatus 22 is associated with multiple branch circuits 12 and provides protection-element control for each one of those branch circuits 12. In that regard, the fault detection and control operations performed by the "centralized" version of the control apparatus 22 may still be undertaken independently with respect to each associated branch circuit 12—e.g., the centralized version of the control apparatus 22 performs fault detection processing independently, with respect to each branch circuit 12 that it monitors.

In an alternative embodiment, as suggested by FIG. 3, a control apparatus 22 may be associated with a single branch circuit 12 and control only the protection element 20 for that branch circuit 12. In at least one such embodiment, the control apparatus 22 and the protection element 20 are integrated together into a protection device 34. Such a protection device 34 is, for example, configured for installation within a targeted branch circuit 12 and operates as a stand-alone protective switch for the targeted branch circuit 12.

Nor, however, is the control apparatus 22 limited to the electrical structure or topology shown in the example system 10 of FIG. 1. In another example not explicitly illustrated, the system 10 at least in part has a "ring" topology in which DC buses 16 are islands that are interconnected via switches or converters. Each island may have multiple branch circuits 12 powering loads 14 or coupling into other DC buses 16. Within the context of such an electrical structure, the control apparatuses 22 contemplated herein can be configured to protect DC islands within the ring, e.g., by controlling the switches or converters interconnecting DC buses 16 within the ring. Additionally or alternatively, given control apparatuses 22 can be used to protect the individual branch circuits 12 from any one or more of the buses 16.

With these examples in mind, a control apparatus 22 according to the teachings herein is configured to protect a branch circuit 12 in a DC distribution system, e.g., in the system 10. The control apparatus 22 in an example embodiment includes the aforementioned interface circuit 24 and processing circuit 26. The interface circuit 24 is configured to obtain local measurements for the branch circuit 12, e.g., branch voltage and/or branch current measurements for the branch circuit 12 and/or branch voltage or current derivatives.

These measurements are suggested by the dashed lines shown between the control apparatuses 22-1, 22-2 and 22-3, and their respective branch circuits 12-1, 12-2 and 12-3. The interface circuit 24 in this regard will be understood as including filters, buffers, amplifiers, and digitizers, or other such circuitry as needed, to obtain voltage and/or current measurements for the branch circuit 12.

In turn, the processing circuit 26 is configured to determine that a fault condition exists in the DC distribution system, accumulate pseudo energy values while the fault condition persists, and trip a protection element 20 for the branch circuit 12 responsive to the accumulated pseudo energy values reaching a defined pseudo energy threshold. In this context, the pseudo energy values are accumulated based on the processing circuit 26 being configured to repeatedly sample current for the branch circuit 12.

To appreciate the "pseudo energy" designation, consider that energy, E, is classically expressed as $$E = \text{Power} \times \text{Time},$$

and that real electrical power, P, is expressed as $$P = VI = I^2 R,$$

where V=voltage, I=current and R=resistance. In one implementation of pseudo energy calculation taught herein, the control apparatus 22 assumes a unity value for R, i.e., R=1. This assumption reflects the recognition that resistance at the point of a short circuit fault is low. Pseudo energy calculations also may use the cube (or even higher power exponents) of the current, rather than its square. Notably, the use of these higher-power current values can help accentuate the differences in fault current magnitudes between a branch circuit 12 that is directly involved in a short circuit fault and a branch circuit 12 that is not directly involved in the fault, i.e., a branch circuit 12 that is remote from the fault.

In order to further accentuate the current magnitude differences, the order of the pseudo energy may be a constant or a time dependent variable. For example, it can be calculated using the cube or high-power during the initial transient period, say up to 1-2 millisecond, and then using the square for the remaining fault period or the defined time period. Thus, in one or more embodiments, for accumulating the pseudo energy values while the fault condition persists, the processing circuit 26 is configured to compute each pseudo energy value based on branch current measurements or estimates raised to an exponential power of n equals 2 or greater, and vary the exponential power as a function of time. For example, the processing circuit 26 is configured of use a higher exponential power during an initial time period following the determination that the fault condition exists, and use a lower exponential power during a subsequent time period.

By virtue of tying the tripping control action for a given branch circuit 12 to pseudo energy accumulated for that branch circuit 12, and by properly setting the pseudo energy threshold used to trigger tripping, the protection element 20 in the affected branch circuit 12—i.e., the branch circuit 12 directly involved in the fault—will trip before the like-controlled protection elements 20 within the branch circuits 12 that are not directly involved in the fault. To obtain that desired behavior, in one or more embodiments herein, the defined pseudo energy threshold used for protecting each given branch circuit 12 is configured according to the location or position of that branch circuit 12 within the electrical structure of the system 10.

Such details reflect the advantageous recognition herein that the difference in fault currents seen in different branch circuits 12 in the system 10 can be enlarged by converting the branch current, squared or otherwise, for the branch circuit 12 being protected to unit-less energy, $\int i^n dt$. This unitless energy value effectively discriminates different fault locations and thus enables a distributed protection mechanism—i.e., distributed protection elements 20 and corresponding control apparatuses 22—to reliably trip the protection element 20 in the branch circuit 12 directly involved in the fault.

In more detail, in one or more embodiments, upon determining that a fault condition exists and while the fault condition persists, the processing circuit 26 of a given control apparatus 22 is configured to accumulate pseudo energy values for the branch circuit 12, based on being configured to: (a) accumulate pseudo energy values while the fault condition persists, based on repeatedly sampling current for the branch circuit, and (b) trip a protection element for the branch circuit 12 responsive to the accumulated pseudo energy values reaching a defined pseudo energy threshold.

In one embodiment, accumulating the pseudo energy values comprise accumulating the pseudo energy values over successive calculation intervals. This accumulation processing is based on the processing circuit 26 being configured to: (a) determine the difference between a branch current measurement or estimate for a present calculation interval, as raised to an n-th power, and a branch current measurement or estimate for a preceding calculation interval, as raised to the n-th power, (b) multiply the difference by an elapsed time between the present calculation interval and the preceding calculation interval, to obtain the pseudo energy value for the present calculation interval, and (c) add the pseudo energy value for the present calculation interval to the running sum.

In the same or other embodiments, the processing circuit 26 is configured to reduce a sampling rate used for sampling the branch current, based on using a branch current estimate rather than a branch current measurement for calculation of the pseudo energy value in at least some calculation intervals over which the pseudo energy values are accumulated. For example, every other calculation interval uses an estimate of branch circuit current, e.g., as extrapolated from a prior actual measurement.

In at least some embodiments, the defined pseudo energy threshold is set according to a location of the branch circuit 12 within the electrical structure of the system 10—e.g., as a function of the RLC parameters associated with the branch circuit 12 within the system 10. Further, in one or more embodiments, the defined pseudo energy threshold used by a given control apparatus 22 for controlling tripping of the protection element 20 in a monitored branch circuit 12 is one among a plurality of defined pseudo energy thresholds corresponding to different load current values.

In such embodiments, the processing circuit 26 of the given control apparatus 22 is configured to choose which defined pseudo energy threshold to use for tripping the protection element 20, from among the plurality of defined pseudo energy thresholds, based on selecting the defined pseudo energy threshold that best matches a pre-fault load condition of the branch circuit 12. In other words, because the magnitude and/or other parameters of the transient fault current in the branch circuit 12 is a function of the pre-fault current in the branch circuit 12, the control apparatus 22 adjusts the defined pseudo energy threshold used for tripping control, as a function of the pre-fault loading conditions of the branch circuit 12.

Also, as noted, the processing circuit 26 does not begin accumulating pseudo energy until it detects that a fault condition exits. Correspondingly, in one or more embodiments, the processing circuit 26 is configured to determine that the fault condition exists, based on being configured to detect the fault condition from branch circuit voltage or current, or from a derivative of the branch circuit voltage or current. Further, in one or more embodiments, the processing circuit 26 is configured to determine whether the fault condition persists, based on being configured to repeatedly determine at least one of: whether or not a branch current is above a current threshold used for fault detection and whether or not a branch voltage is below a voltage threshold used for fault detection. Any or all such measurements may be filtered or otherwise qualified for control stability, subject to response time limits for the protection action.

In the same or further embodiments, the processing circuit 26 is configured to reset the protection element 20 responsive to at least one of: a control input received at the control apparatus 22, a determination that the fault condition no longer exists, and a determination that the fault condition no longer exists in combination with a determination that a defined period of time has elapsed since tripping the protection element 20. Here, a control input may come from a higher-level, supervisory controller having a signaling link with the control apparatus 22, e.g., via a signaling circuit included in the interface circuit 24. Additionally or alternatively, the control input may be a manual input from a qualified user, e.g., a maintenance person associated with the owner of the system 10.

Also as noted previously, in some embodiments, a given control apparatus 22 and a given protection element 20 may be integrated together, e.g., to form an integrated protection device 34 such as is shown in FIG. 3. It will be appreciated that the defined pseudo energy threshold(s) used by the control apparatus 22 in such embodiments may be loaded into or otherwise configured in the control apparatus 22 as predefined values comprising part of the aforementioned configuration data 30. Such values may be calculated or otherwise set in view of the electrical characteristics of the system 10 with respect to the particular branch circuit 12 at issue, or at least with respect to the general location of the branch circuit 12 within the overall electrical structure of the system 10.

Further, in at least some embodiments, the control apparatus 22 supports a field configuration process, or other post-manufacturing process, in which the defined pseudo energy threshold(s) used by the control apparatus 22 for protection control are loaded into the control apparatus 22 via a laptop or other programming device. Such operations may be restricted by locks or other tamper-impeding physical features and/or may be restricted using encryption, proprietary signaling protocols, or other mechanisms known for securing communications and limiting communications to authorized devices and software.

In any case, the value of the predefined pseudo energy threshold(s) used to control protection-element tripping for a given branch circuit 12 may be set as a function of the known or expected loading of the branch circuit 12, the types of load(s) 14 on the branch circuit 12, and the impedances looking into or out of the branch circuit 12. With respect to a plurality of control apparatuses 22 which are configured for individual installation at respective branch circuits 12 within the system 10, each such control apparatus 22 uses a defined pseudo energy threshold suitable for the electrical characteristics associated with its respective branch circuit 12.

Further, each such control apparatus 22 is configured to accumulate pseudo energy only in the presence of a detected fault, and to otherwise clear or not accumulate pseudo energy. That behavior, in combination with use of the location-tailored pseudo energy thresholds, means that the protection element 20 in the branch circuit 12 where the fault is located will be tripped before the protection elements 20 in the branch circuits 12 that are not directly involved in the fault.

FIG. 4 provides an example plot of transient currents associated with a first branch 12 ("BRANCH 1") which is directly involved in a short circuit fault, and a second branch 12 ("BRANCH 2") which is not directly involved in the fault. The first peak in each current plot is associated with rapid capacitor discharging, while the second, broader peak is primarily attributed to distributed energy sources in the system 10. One thus sees that current derivatives and/or peak detectors are not reliable indicators of fault location, but pseudo energy accumulation as taught herein obviates those problems.

That is, assuming that BRANCH 1 is directly involved in the fault and BRANCH 2 is not directly involved in the fault—i.e., it is separated by some electrical "distance" from the fault location—and assuming that the defined pseudo energy thresholds are properly set for BRANCH 1 and BRANCH 2, the accumulated pseudo energy values for BRANCH 1 will reach the defined pseudo energy threshold of BRANCH 1 before the accumulated pseudo energy values for BRANCH 2 reach the defined pseudo energy threshold of BRANCH 2. Thus, the protection element 20 for BRANCH 1 will be tripped before the accumulated pseudo energy values for BRANCH 2 reach the correspondingly defined pseudo energy threshold of BRANCH 2.

Figure 5:
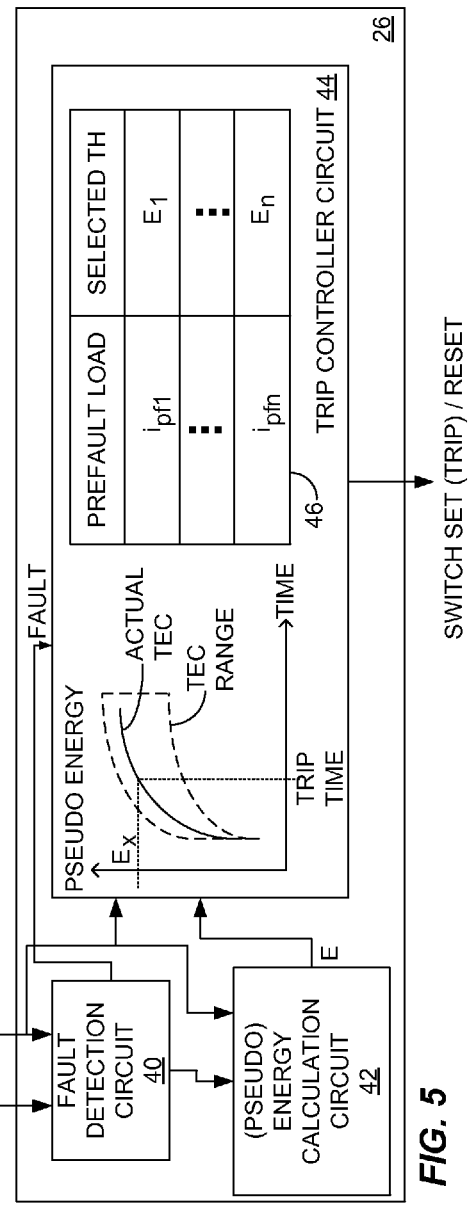
FIG. 5 is a block diagram for an example processing circuit implemented in one embodiment of a control arrangement.

To better understand this behavior, consider the example of FIG. 5. The processing circuit 26 of a given control apparatus 22 includes a fault detection circuit 40, a pseudo energy calculation circuit 42, and a trip controller circuit 44. The trip controller circuit 44 in one or more embodiments is configured with a lookup table 46 or other data structure included as part of the configuration information 30.

The fault detection circuit 40 includes measurement circuits—e.g., buffers, filters, amplifiers, digitizers—as needed for obtaining branch circuit voltage and/or current measurements, for use in fault detection, or the fault detection circuit 40 interfaces with such circuitry as may be included in the interface circuit 24. In any case, the fault detection circuit 40 provides a fault-detection signal to the trip controller circuit 44. In other embodiments, the fault detection circuit 40 or the pseudo energy calculation circuit 42 provides the trip controller circuit 44 with raw values that are processed by the trip controller circuit 44 to detect the occurrence/persistence of a fault condition.

The pseudo energy calculation circuit 42 is configured to, for example, obtain branch current samples at a defined sampling rate, for an associated branch circuit 12, and to accumulate corresponding pseudo energy values. The running sum representing the accumulation of pseudo energy values may be initialized to zero in a pre-fault state, and is actively maintained while the fault condition persists. The accumulated pseudo energy values are shown as "E" in FIG. 5, as output from the pseudo energy calculation circuit 42 to the trip controller circuit 44.

In some embodiments, the trip controller circuit 44 uses a single defined pseudo energy threshold for evaluating the accumulated pseudo energy values output from the pseudo energy calculation circuit 42. In other embodiments the defined pseudo energy threshold is adapted as a function of pre-fault load conditions. For example, the lookup table 46 includes a number of first entries $i_{pfx}$ corresponding to different pre-fault load conditions—e.g., expressed as different pre-fault load current ranges. Here, "x" denotes 1, 2, etc. Each first entry maps to a corresponding defined pseudo energy threshold, $E_x$. Thus, the particular $E_x$ value used for tripping control of the protection element 20 in the associated branch circuit 12 depends on the pre-fault conditions known or measured for the branch circuit 12.

This plurality or set of $E_x$ values defines a Time Energy Curve, TEC, range for the control apparatus 22. Further, one sees that the trip time of the control apparatus 22 is determined as a function of the actual TEC, which is a function of the actual pseudo energy accumulation rate experienced during the fault condition, and the "trip" point along the actual TEC. That trip point is determined by the intersection point corresponding to the $E_x$ value selected from the lookup table 46.

When a given control apparatus 22 is configured to protect two or more branch circuits 12 in the DC distribution system, each branch circuit 12 has a respective protection element 20 and is associated with a respectively defined pseudo energy threshold. Correspondingly, the interface circuit 24 of this "centralized" version of the control apparatus 22 is configured to obtain measurements for each of the two or more branch circuits 12 and the processing circuit 26 is configured to independently accumulate pseudo energy values for each of the two or more branch circuits 12 and to independently trip the respective protection element of any given one of the two or more branch circuits 12. That tripping is done in response to the accumulated pseudo energy values for the given branch circuit 12 reaching the defined pseudo energy threshold of the given branch circuit 12. The processing circuit 26 of a centralized control apparatus 22 may be configured to use a different lookup table 46 of $E_x$ values for each associated branch circuit 12.

Figure 6:
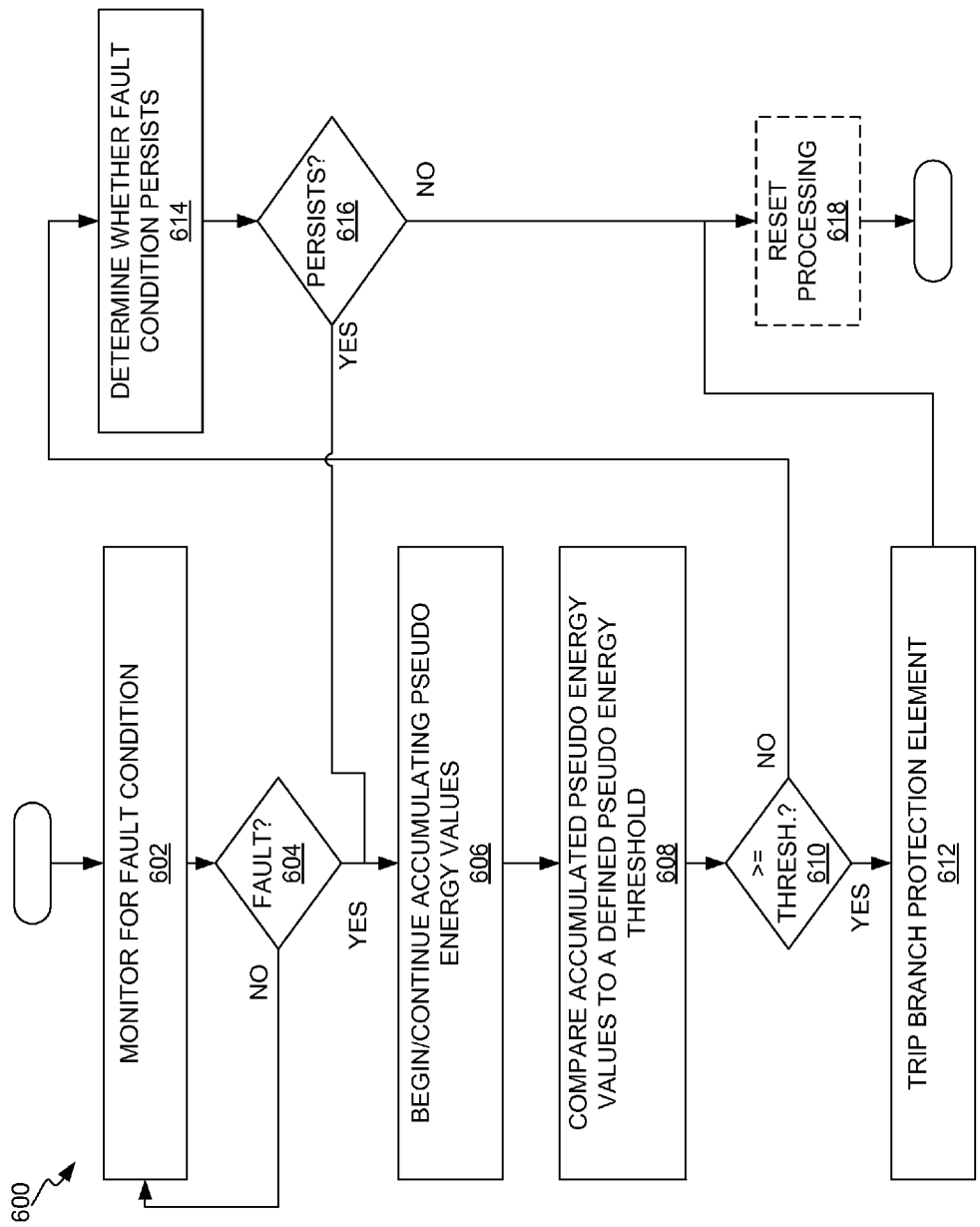
FIG. 6 is a logic flow diagram of one embodiment of a method of protecting a branch circuit in a DC distribution system.

FIG. 6 illustrates one method 600 of operation for a control apparatus 22, such as described above. It will be appreciated that a control apparatus 22 may be configured to carry out the method 600 based on its execution of program instructions comprising the computer program 32 shown in FIG. 1, or based on the configuration of fixed circuitry within the control apparatus 22. Further, it will be appreciated that one or more steps or operations in the method 600 may be performed in an order other than that suggested in FIG. 6 and/or performed in conjunction with other processing. Further, the processing of FIG. 6 may be done by a centralized control apparatus 22 with respect to each branch circuit 12 associated with the centralized control apparatus 22, or by individual control apparatuses 22 associated with individual branch circuits 12.

The method 600 includes monitoring (Block 602) for a fault condition. In one embodiment, fault monitoring comprises current-based monitoring, in which the control apparatus 22 repeatedly measures branch current and compares the measured current with a fault current threshold, e.g., an upper limit on current. In another embodiment, fault monitoring comprises voltage-based monitoring, in which the control apparatus 22 monitors branch voltage and compares the measured voltage with fault voltage threshold—e.g., a lower limit on voltage. Some embodiments combine voltage and current monitoring, such that a fault is detected if either the local branch current or the local branch voltage is detected as being outside of defined operating limits. In other embodiments, both voltage and current must go outside of defined operating limits before a fault condition is declared by the control apparatus 22.

In still other embodiments, the control apparatus 22 is configured to calculate derivatives of the branch voltage measurements and/or the branch current measurements. In such embodiments, the control apparatus 22 detects a fault within the system 10 based on determining that defined rate-of-change limits for the voltage and/or current in the local branch circuit 12 have been exceeded. The fault declaration may, of course, be filtered or otherwise qualified, subject to response time limits, to ensure more robust fault detection.

If no fault is detected (NO from Block 604), the control apparatus 22 continues monitoring for fault conditions and does not begin or continue accumulating a pseudo energy value and does not trip the corresponding protection element 20. Of course, the control apparatus 22 may perform other actions too, such as reporting status to higher-level control entities within the system 10, at least in embodiments of the control apparatus 22 that provide communication or signaling with external devices, e.g., via a communication circuit included in the interface circuit 24.

If a fault condition is detected (YES from Block 604), the processing circuit 26 begins accumulating pseudo energy values (Block 606). In one example of such processing, the processing circuit 26 begins repeatedly sampling branch current, and calculates corresponding pseudo energy values, which are added to a running sum. For example, the processing circuit 26 samples the branch circuit current every "x" milliseconds, or faster, squares each measurement, computes a new pseudo energy based on each squared measurement, and adds the new pseudo energy value to the running sum. At each such accumulation, or after every second, third, or other number of accumulations, the running sum is compared to the defined pseudo energy threshold. That is, the accumulated pseudo energy values are compared to the defined pseudo energy threshold (Block 608) and the protection element 20 is tripped (Block 612) responsive to determining that the accumulated pseudo energy values meet or exceed the defined pseudo energy threshold (YES from Block 610).

If, at the comparison check done in Block 610, the processing circuit 26 determines that the accumulated pseudo energy values are below the defined pseudo energy threshold (NO from Block 610), then processing continues with the processing circuit 26 determining whether the fault condition still persists (Block 614). This check comprises, for example, comparing a new or most recent measure of the local branch current, or a corresponding filtered value, to a fault current threshold value. If the processing circuit 26 decides based on its evaluation that the fault condition does not still exist (NO from Block 616), it transitions to "reset" processing (Block 618). Note that the persist/does-not-persist fault condition evaluation can be made on any interval appropriate for the desired response time.

In an example case of reset processing, the processing circuit 26 stops pseudo energy accumulation and in some embodiments it clears the then-existing accumulated pseudo energy values and otherwise "resets" its overall control algorithm. However, if the processing circuit 26 decides that the fault condition still persists (YES from Block 616), processing returns to Block 606, where it continues pseudo energy accumulation.

Broadly, with respect to a given branch circuit 12 in the system 10, the method 600 can be understood as determining that a fault condition exists in the system 10, and accumulating pseudo energy values while the fault condition persists. Pseudo energy is accumulated by repeatedly sampling branch current and calculating corresponding pseudo energy values. The method 600 further includes tripping a protection element 20 for the branch circuit 12 responsive to the accumulated pseudo energy values reaching a defined pseudo energy threshold.

In an example approach, the processing circuit 26 is configured to calculate a new pseudo energy value in each calculation interval and to accumulate the pseudo energy values over successive calculation intervals. The calculation interval rate may equal the current sampling rate used for sampling branch current, or it may be higher than the current sampling rate in embodiments that use estimated branch current in at least some of the calculation intervals.

Let $t_1$ be a time value associated with a preceding calculation interval and $t_2$ be a time value associated with a present calculation interval. Similarly, let $i_1^n$ be the estimated or sampled branch current for the preceding calculation interval, raised to the power of n=2 or greater. Likewise, let $i_2^n$ be the estimated or sampled branch current for the present calculation interval, raised to the same power of n. In one or more embodiments, the pseudo energy value $E_2$ for the present calculation interval is thus calculated as $$E_2=(i_2^n-i_1^n)\cdot(t_2-t_1).$$

Note that the $t_2$ and $t_1$ times may be in expressed in some running count value, e.g., fractions of a second. Thus, accumulating pseudo energy values comprises, for example, calculating and accumulating E values at successive calculation intervals, based on the measured or estimated current at each such interval and the elapsed time from the prior calculation.

Such processing advantageously captures or accounts for differences in the fault currents occurring in different branch circuits 12 within the system 10, which differences are attributable, for example, to the associated supply grid connections, local generators, distributed capacitors, and energy storage devices at various locations in the system 10. Distributed capacitors include the capacitances of the lines in the system 10 and, for example, of any converters—e.g., DC-to-DC and DC-to-AC converters—connected as loads 14 in the system 10.

The fault currents seen at different branch circuits 12 in the system 10 depend on the associated resistance, inductance and capacitance, RLC, values. The characteristics of transient fault current for any given branch circuit 12 in the system 10 can be estimated for each branch circuit 12 from the known electrical structure of the system 10, and the defined energy thresholds set accordingly.

As noted, because DC fault currents develop rapidly, the processing circuit 26 in any given control apparatus 22 may be configured to use both branch current samples and branch current estimates. For example, the required sampling rate can be halved by calculating every other pseudo energy value using an estimated branch current rather than a measured branch current. Other fractional reductions are contemplated and the mix of measured versus estimated fault current may be dynamically changed, e.g., as a function of current slope.

In one example of branch current estimation, the processing circuit 26 approximates the branch current at a time instant between actual current samples as a function of the slope of the measured current and the time difference between the last actual sample and the estimation time. Such estimation can also be used to shorten the response time of control apparatus 22, such as by predicting future branch current values and accumulating pseudo energy values for the predicted current values.

The defined pseudo energy threshold used on a given branch circuit 12 may also be configured in view of the Safe Operating Area or SOA ratings of equipment connected to the branch circuit 12, e.g., for a converter or for other power semiconductor switches. Each protected branch circuit 12 can have a group of TECs, including Emin and Emax values as determined by the minimum and maximum energy limits defined for connected equipment. Further, the defined pseudo energy threshold(s) used for a given branch circuit 12 can be based on any one or more protection criteria, including reliability, stability, selectivity, speed, etc. Effectively, then, the shape of the TEC used for protecting a given branch circuit 12 may be different than that used in another branch circuit 12, in dependence on differing protection requirements. Still further, to the extent that multiple pseudo energy thresholds are defined, e.g., corresponding to differing pre-fault conditions, the TECs represented by them may have different shapes and there may be discontinuities or step changes between them.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a control apparatus of protecting a branch circuit in a Direct Current, DC, distribution system, said method comprising:
   determining that a fault condition exists in the DC distribution system;
   calculating, for each of a plurality of calculation intervals, a pseudo energy value, the pseudo energy value being based at least in part on a difference between branch current measurements or estimates of successive calculation intervals that have been increased by an exponential power, the exponential power being variable as a function of time;
   accumulating a running sum of the calculated pseudo energy values while the fault condition persists; and
   tripping a protection element for the branch circuit responsive to the accumulated running sum of calculated pseudo energy values reaching a defined pseudo energy threshold.

2. The method of claim 1, wherein determining the difference between a branch current measurement or estimate comprises:
   determining a difference between a present calculation interval, as raised by the exponential power, the by the exponential power being an n-th power, and a branch current measurement or estimate for a preceding calculation interval, as raised to the n-th power, wherein n is equal to or greater than two;
   multiplying the difference between the present and preceding calculation intervals by an elapsed time between the present calculation interval and the preceding calculation interval, to obtain the pseudo energy value for the present calculation interval; and
   adding the pseudo energy value for the present calculation interval to the running sum.

3. The method of claim 1, further comprising reducing a sampling rate used for sampling the branch current, based on using a branch current estimate rather than a branch current measurement for calculation of the pseudo energy values in at least some calculation intervals over which the pseudo energy values are accumulated.

4. The method of claim 1, wherein the defined pseudo energy threshold is set according to a location of the branch circuit within the electrical structure of the DC distribution system.

5. The method of claim 1, wherein the defined pseudo energy threshold is one among a plurality of defined pseudo energy thresholds corresponding to different load values, and wherein the method further comprises choosing which defined pseudo energy threshold to use for tripping the protection element, from among the plurality of defined pseudo energy thresholds, based on selecting the defined pseudo energy threshold that best matches a pre-fault load condition of the branch circuit.

6. The method of claim 1, wherein determining that the fault condition exists comprises detecting the fault condition from a branch circuit voltage or current, or from a derivative of the branch circuit voltage or current.

7. The method of claim 1, further comprising determining whether the fault condition persists, wherein determining whether the fault condition persists comprises repeatedly determining at least one of:
   whether or not a branch current is above a current threshold used for fault detection; and whether or not a branch voltage is below a voltage threshold used for fault detection.

8. The method of claim 1, further comprising resetting the protection element responsive to at least one of: receiving a control input at the control apparatus, determining that the fault condition no longer exists, and determining that the fault condition no longer exists in combination with determining that a defined period of time has elapsed since tripping the protection element.

9. A method in a control apparatus of protecting a branch circuit in a Direct Current, DC, distribution system, said method comprising:
- determining that a fault condition exists in the DC distribution system;
- accumulating pseudo energy values while the fault condition persists, based on repeatedly sampling current for the branch circuit; and
- tripping a protection element for the branch circuit responsive to the accumulated pseudo energy values reaching a defined pseudo energy threshold,
- wherein accumulating the pseudo energy values while the fault condition persists includes computing each pseudo energy value based on branch current measurements or estimates raised to an exponential power of n equals 2 or greater, and wherein the method further includes varying the exponential power as a function of time, based on using a higher exponential power during an initial time period following the determination that the fault condition exists, and using a lower exponential power during a subsequent time period.

10. A control apparatus configured to protect a branch circuit in a Direct Current, DC, distribution system, said control apparatus comprising:
- an interface circuit configured to obtain local measurements for the branch circuit;
- a processing circuit configured to:
  - determine that a fault condition exists in the DC distribution system;
  - calculate, for each of a plurality of calculation intervals, a pseudo energy value that is based at least in part on a difference between branch current measurements or estimates of successive calculation intervals that have been increased by an exponential power, the exponential power being variable as a function of time;
  - accumulate a running sum of the calculated pseudo energy values while the fault condition persists; and
  - trip a protection element for the branch circuit responsive to the accumulated pseudo energy values reaching a defined pseudo energy threshold.

11. The control apparatus of claim 10, wherein the control apparatus is configured to protect two or more branch circuits in the DC distribution system, each branch circuit having a respective protection element and being associated with a respectively defined pseudo energy threshold, and, correspondingly, wherein the interface circuit is configured to obtain measurements for each of the two or more branch circuits and the processing circuit is configured to independently accumulate pseudo energy values for each of the two or more branch circuits and to independently trip the respective protection element of any given one of the two or more branch circuits, responsive to the accumulated pseudo energy values for the given branch circuit reaching the defined pseudo energy threshold of the given branch circuit.

12. The control apparatus of claim 10, wherein the processing circuit is configured to accumulate pseudo energy values based on being configured to accumulate the pseudo energy values over successive calculation intervals, including being configured to:
- determine a difference between a branch current measurement or estimate for a present calculation interval, as raised by the exponential power to an n-th power, and a branch current measurement or estimate for a preceding calculation interval, as raised to the n-th power, wherein n is equal to or greater than two;
- multiply the difference by an elapsed time between the present calculation interval and the preceding calculation interval, to obtain the pseudo energy value for the present calculation interval; and
- add the pseudo energy value for the present calculation interval to the running sum.

13. The control apparatus of claim 10, wherein the processing circuit is configured to reduce a sampling rate used for sampling the branch current, based on using a branch current estimate rather than a branch current measurement for calculation of the pseudo energy value in at least some calculation intervals over which the pseudo energy values are accumulated.

14. The control apparatus of claim 10, wherein the defined pseudo energy threshold is set according to a location of the branch circuit within the electrical structure of the DC distribution system.

15. The control apparatus of claim 10, wherein the defined pseudo energy threshold is one among a plurality of defined pseudo energy thresholds corresponding to different load values, and wherein the processing circuit is configured to choose which defined pseudo energy threshold to use for tripping the protection element, from among the plurality of defined pseudo energy thresholds, based on selecting the defined pseudo energy threshold that best matches a pre-fault load condition of the branch circuit.

16. The control apparatus of claim 10, wherein the processing circuit is configured to determine that the fault condition exists, based on being configured to detect the fault condition from a branch circuit voltage or current or from a derivative of the branch circuit voltage or current.

17. The control apparatus of claim 10, wherein the processing circuit is configured to determine whether the fault condition persists, based on being configured to repeatedly determine at least one of:
- whether or not a branch current is above a current threshold used for fault detection; and
- whether or not a branch voltage is below a voltage threshold used for fault detection.

18. The control apparatus of claim 10, wherein the processing circuit is configured to reset the protection element responsive to at least one of: a control input received at the control apparatus, a determination that the fault condition no longer exists, and a determination that the fault condition no longer exists in combination with a determination that a defined period of time has elapsed since tripping the protection element.

19. The control apparatus of claim 10, wherein the control apparatus and the protection element are integrated together as a protection device.

20. A control apparatus configured to protect a branch circuit in a Direct Current, DC, distribution system, said control apparatus comprising:
- an interface circuit configured to obtain local measurements for the branch circuit;
- a processing circuit configured to:
  - determine that a fault condition exists in the DC distribution system; and accumulate pseudo energy values while the fault condition persists, based on repeatedly sampling current for the branch circuit; and trip a protection element for the branch circuit responsive to the accumulated pseudo energy values reaching a defined pseudo energy threshold, wherein, to accumulate the pseudo energy values while the fault condition persists, the processing circuit is configured to:

compute each pseudo energy value based on branch current measurements or estimates raised to an exponential power of n equals 2 or greater; and vary the exponential power as a function of time, based on using a higher exponential power during an initial time period following the determination that the fault condition exists, and using a lower exponential power during a subsequent time period.

* * * * *